United States Patent [19]

Bishop et al.

[11] Patent Number: 5,385,698
[45] Date of Patent: Jan. 31, 1995

[54] DIMENSIONALLY ACCURATE EXPANDED FOAM CASTING PATTERN

[75] Inventors: Gary E. Bishop, Troy, Mich.; Patrick J. Van Ryckeghem, Franklin, Tenn.

[73] Assignee: Saturn Corporation, Troy, Mich.

[21] Appl. No.: 871,976

[22] Filed: Apr. 23, 1992

[51] Int. Cl.$^6$ .............................................. B29C 67/22
[52] U.S. Cl. ........................................ 264/53; 264/55; 264/DIG. 9; 264/DIG. 15
[58] Field of Search .................... 264/51, 53, 55, 232, 264/DIG. 9, DIG. 15; 55/26

[56] References Cited

U.S. PATENT DOCUMENTS

| | | | |
|---|---|---|---|
| 3,126,432 | 3/1964 | Schuur | 264/DIG. 15 |
| 3,139,466 | 6/1964 | Couchman | 264/51 |
| 3,170,010 | 2/1965 | Schultz et al. | 264/51 |
| 3,255,286 | 6/1966 | Luc-Belmont | 264/109 |
| 3,273,873 | 9/1966 | Stanchel | 263/26 |
| 3,278,658 | 10/1966 | Immel | 264/51 |
| 3,328,497 | 6/1967 | Baxter et al. | 264/53 |
| 3,347,961 | 10/1967 | Russell | 264/53 |
| 3,359,353 | 12/1967 | Oddi | 264/53 |
| 3,378,245 | 4/1968 | Frank | 263/21 |
| 3,417,170 | 12/1968 | Knapp | 264/51 |
| 3,452,124 | 6/1969 | Knapp | 264/53 |
| 3,505,249 | 4/1970 | Skochdopole et al. | 260/2.5 |
| 3,577,360 | 5/1971 | Immel | 264/53 |
| 3,631,133 | 12/1971 | Battigelli | 260/2.5 |
| 3,639,551 | 2/1972 | Leach | 264/55 |
| 3,725,320 | 4/1973 | Wang | 264/DIG. 15 |
| 3,800,018 | 3/1974 | Charpentier | 264/53 |
| 4,032,609 | 6/1977 | Smith | 264/53 |
| 4,060,354 | 11/1977 | Smith | 425/4 R |
| 4,073,843 | 2/1978 | Smith | 264/53 |
| 4,579,701 | 4/1986 | Park et al. | 264/53 |
| 4,682,989 | 7/1987 | Maeda et al. | 264/53 |
| 4,816,199 | 3/1989 | Matz et al. | 264/53 |
| 4,854,368 | 8/1989 | Vezirian | 164/61 |
| 5,041,465 | 8/1991 | Sonnenberg | 264/DIG. 15 |
| 5,053,437 | 10/1991 | Moll et al. | 264/DIG. 5 |
| 5,078,932 | 1/1992 | Bissinger et al. | 264/51 |
| 5,110,836 | 5/1992 | Harclerode et al. | 264/DIG. 15 |

Primary Examiner—Allan R. Kuhns
Attorney, Agent, or Firm—George A. Grove

[57] ABSTRACT

A method is disclosed for heating pre-expanded foundry-pattern molding beads of polystyrene or the like in a stream of hot air to reduce the vapor-forming expansion agent content for the purpose of producing more dimensionally accurate, molded foam bead casting patterns.

5 Claims, 2 Drawing Sheets

DIMENSIONALLY ACCURATE EXPANDED FOAM CASTING PATTERN

This invention pertains to the production of metal castings using an expendable foam pattern embedded in an unbonded sand mold. More specifically, this invention relates to the making of molded, expanded bead foam foundry patterns that are dimensionally accurate and stable.

BACKGROUND OF THE INVENTION

Commercial castings such as aluminum engine blocks or iron crankshafts are now conventionally made using a practice that is sometimes referred to as lost foam casting. In lost foam casting, an expendable foam pattern is molded of expanded cellular beads of a synthetic resin such as polystyrene. The resulting pattern defines the shape of the article(s) to be cast and yet it is very light in weight and contains relatively little polymeric material. The ultimate casting pattern including casting gates, runners and risers may be assembled by gluing together two or more molded foam sections. The light weight, assembled foam pattern is embedded in a mold of loose unbonded sand particles. Molten metal such as a suitable aluminum or iron casting alloy is then poured onto the pattern that is embedded in the loose sand. The hot metal burns out and displaces the consumable pattern, as it flows against it and vaporizes it. The generated gases escape through the porous, unbonded sand particle mold, and the metal solidifies within the loose sand in the shape of the original pattern. Since the sand particles are unbonded, the solidified casting is readily removed from the mold. The casting accurately duplicates the shape of the expendable pattern that it displaces.

When expendable patterns are used in a casting line, it is obvious that a new pattern must be provided for each casting. Each such pattern must accurately duplicate the dimensions and shape of the casting to be produced. Thus, in the lost foam casting process, the practice for making the patterns is a critical part of the overall foundry operation because so many accurate patterns must be made, and they must be made on a timely basis to accommodate the casting line schedule.

Patterns for the lost foam casting process are typically made of an expandable synthetic resin such as polystyrene, polymethylmethacrylate or polyalkylene carbonate. In each instance, the resin is initially provided in the form of a small, dense bead in which is dispersed by dissolution or by entrainment a small amount of an expanding agent. Although our invention is applicable to the use of any suitable, expandable bead material for the preparation of lost form patterns, it will be described in detail with respect to expanded polystyrene beads of T size because they are currently used in largest volume for casting patterns. Expandable polystyrene (sometimes EPS) is commercially available in the form of relatively small (e.g., 0.25 mm diameter, 40 pounds/ft$^3$ density) white beads. The beads are formed of a suitable grade of polystyrene homopolymer for the intended molding purpose. Distributed throughout each polystyrene bead is an amount, usually about 5.5 to 6.5 percent by weight, of a suitable vaporizable expanding agent such as the hydrocarbon pentane. A portion of the pentane is probably dissolved in the polymer matrix of the bead, but a major portion of the pentane is distributed in microcavities throughout the polystyrene bead.

Depending upon the temperature of the environment in which the beads are stored and whether the container is closed or not, the pentane can slowly escape from the polystyrene beads. Raw beads (as the dense beads are called) are preferably stored in suitable closable containers so that they retain their pentane content.

The dense, raw beads are economical for shipping and storage but contain too much expanding agent and would expand too erratically for a one-step pattern molding operation. Before patterns can be molded from the beads, the beads are subjected to a pre-expansion operation in which they are expanded and reduced in density by heating. Pre-expansion equipment is readily available commercially. In one pre-expansion process, a group of the beads is conveyed into a closed cavity where the beads are contacted with saturated steam at low superatmospheric pressure. The steam heat produces an expansion of the beads so that their diameter is increased, e.g., about fourfold, and some of the expanding agent, the pentane, is lost. At the conclusion of the pre-expansion step, the density of the beads is typically in the range of 1 to 1.6 pounds per cubic foot, and the content of the pentane at this stage is suitably about four to five percent by weight of the bead. The diameter of the bead is now about one millimeter. The expanded bead has a cellular structure and is close to the size at which it can be suitably molded into a lost foam foundry pattern. In another version of the pre-expansion process, the beads are drawn into a space which is evacuated, and then they are heated at about 200° F. in the vacuum to accommodate the expansion of the beads. After this stage, the expanded beads are typically screened to remove any of the raw beads that fail to undergo the expansion process or any clumps of beads that are stuck together.

The pre-expanded beads are now stored in a permeable container for a minimum of two hours to permit the internal bead pressure to stabilize to atmospheric level.

In conventional practice, the beads are now ready to be molded into suitable foundry patterns. The beads are introduced into a mold in a desired predetermined quantity usually determined by weight. The mold cavity is adapted to be heated (such as with steam) so as to further expand the beads so that they completely fill the cavity, assume the shape and surface of the cavity wall and become fused to each other. The mold is also adapted for cooling so that after the beads are fused together into the pattern and are strong enough to retain its shape. The mold is cooled (usually with water), which cools the outside surfaces of the pattern. The cavity is opened and the pattern removed from it.

The patterns are then loaded onto racks for drying (from the wet molds) and aging or packed into shipping containers, depending upon whether the pattern manufacturer is close to the casting operation or not. These polystyrene patterns are light in weight (about one pound/ft$^3$). The difficulty is that they are not dimensionally stable and, therefore, frequently inaccurate. In order to assure reproducible dimensional stability from pattern to pattern and thus from casting to casting, it has been the practice to age patterns so that they come to a reproducible final configuration and dimensions. This aging process is quite prolonged. In one practice, the patterns are stored at approximately ambient conditions for as long as 30 days in order for their pentane content to stabilize (and for any cooling water from the mold to evaporate) and for the patterns to reach their final dimensions. Since a 30 day storage plan is quite long and requires a large floor space, this type of practice would be carried out at a manufacturer of patterns that is remote from the casting operation itself. If a shorter aging process is desired, it is known that the patterns may be aged in an oven at a suitable elevated temperature, e.g., 165° F., circulating air (for 8 to 48 hours). Both the room temperature aging and the more rapid oven aging process are suitable for stabilizing the dimensions of the patterns. Once the dimensional change of the pattern from such an aging process is known, the original pattern configuration can be established so as to produce castings of a desired dimensional accuracy. The difficulty as far as this aging process is concerned is that it is extremely prolonged if it is carried out at room temperature and requires a large storage area. It also requires an expenditure of substantial energy through the shorter but still prolonged oven aging practice. In addition, oven aging produces more dimensional variations between patterns due to differences in oven temperatures and/or air flow.

Of course, the dimensional accuracy of the resulting castings, whether they are aluminum castings or iron castings, is no better than the dimensional accuracy of the patterns which produce the castings. If there is variation between the patterns or if there is a difference between the actual pattern dimensions and the intended pattern dimensions, it will be necessary to scrap the patterns if they are too small, or the castings will require extra machining if the patterns are too large.

Obviously, it would be preferable to have a shorter or less energy-consuming practice for the manufacture of dimensionally accurate lost foam patterns. In particular, it would be preferable to have a practice for making the patterns which does not require the extended aging process for the finished patterns. It is especially important where it is desired to have a time-efficient practice of making patterns and utilizing them immediately in a casting process to have a pattern making practice that does not require prolonged aging times nor excess energy consumption in order to reach the dimensionally stable pattern configuration.

It is an object of our invention to provide a method of making expanded foam patterns for a lost foam casting process in which the aging process for the patterns is drastically reduced. It is a further object of our invention to provide a time and energy efficient practice for the making of lost foam patterns. It is a more specific object of our invention to provide a practice of making more dimensionally accurate lost foam patterns by controlling the pentane (expanding agent) content of the beads that are used in the pattern molding step.

SUMMARY OF THE INVENTION

In accordance with a preferred embodiment of our invention, these and other objects are accomplished as follows.

As noted above, the raw EPS beads typically have a pentane content of about 5.5 to 6.5 percent by weight. After the beads have been subjected to the described pre-expansion operation, the pentane content has dropped to the order of four to five percent by weight. This amount of pentane, we have found, is still substantially in excess of the amount that is necessary or even suitable for the pattern molding operation. Accordingly, we have discovered that if the pentane content of the pre-expanded beads is reduced by one weight percent or more to a level, for example, suitably in the range from below 2 to about 3.5 percent by weight, more dimensionally stable patterns may be produced. The specific reduced pentane level will be chosen based on, e.g., the size, shape and complexity of the pattern and the acceptable tolerances on its dimensions. A somewhat higher pentane level contributes to the fillout and molding of the pattern. However, lower levels contribute to dimensional stability and predictability. The actual operating range for specific conditions would be approximately ±0.25 percent about a determined or selected nominal value. At least the patterns come to a stable dimension with much less aging.

Accordingly, we prefer to further reduce the expanding agent (i.e., the pentane in the case of EPS) content of the beads after the pre-expansion operation but before the pattern molding operation. The beads are then subjected to a stream of warm air suitably at the temperature of 150° F. to 200° F. for a period of about 90 to 30 minutes (i.e., the higher the air temperature, the shorter the heating time). This operation may be carried out in a cylindrical tower in which the beads are suspended in the stream of heated air so that they are carried by the air and mixed to provide for a fairly uniform resultant pentane content of about 1.75 to 3.75 percent by weight. In a preferred operation, we find that this pentane-reducing process is carried out in an airstream over a period of about 60 minutes with the hot, dry air at a temperature of about 170° F. This treatment with heated air also eliminates the stabilization of the pre-expanded beads required by the prior practice.

We then store the beads (preferably in a closed container) preparatory to the molding operation. We prefer that the pentane-reduced beads be used within a few hours for the molding operation. The beads are molded into a pattern or pattern sections in accordance with the prior art practice described above or other suitable practice. The molded patterns are then simply aged or dried in air for about two hours. These patterns may then be assembled as desired and used in a molding operation at any time during the following three to six days, depending on pattern geometry and dimensional requirements.

Thus, our practice for reducing the pentane content of pre-expanded polystyrene beads by over one or two weight percent enables us to replace prolonged aging or storing of the resultant molded patterns before they can be used in the casting process. The resulting patterns are more dimensionally accurate. Surface blistering of the patterns from oven aging is eliminated and post-expansion (local bumps) is significantly reduced. The lower pentane beads can also be molded in faster cycles. Thus, our process saves manpower, it saves time, it reduces the consumption of energy, and in permits large-scale casting operations to take place without building up a large inventory of patterns. In other words, our practice significantly improves the dimensional accuracy and efficiency of the lost foam pattern making process.

BRIEF DESCRIPTION OF THE DRAWINGS

Other advantages and objects of our invention will become more apparent from the detailed description thereof which follows. In this detailed description, reference will be had to drawings in which.

DETAILED DESCRIPTION OF THE INVENTION

Figure 1:
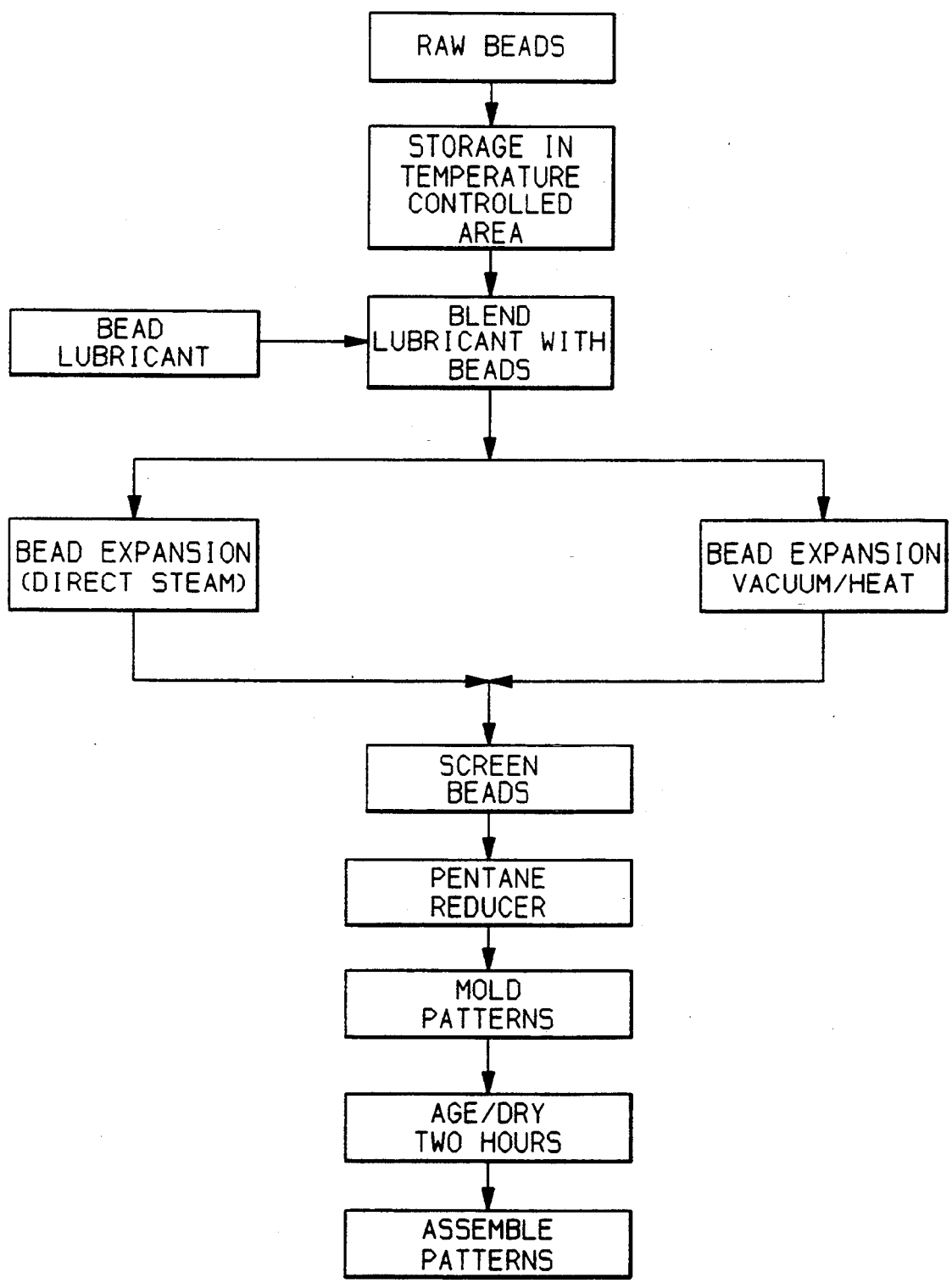
FIG. 1 represents a flow diagram illustrating a complete process for treating expandable beads and molding them in expanded and stabilized (by our process) form into dimensionally stable and accurate casting patterns.

FIG. 1 is a flow diagram that largely follows portions of the "Background of the Invention" and the "Brief Summary of the Invention" portions of this specification which are set forth above.

A basis for our invention is the recognition that the content of the expansion agent in foundry pattern molding beads must be controlled and reduced in absolute amount prior to the pattern molding operation itself. Referring to the flow diagram of FIG. 1, the raw beads initially received in a pattern-making operation are dense and contain an abundance of the expansion agent. In the case of expanded polystyrene beads and the use of pentane as an expansion agent, the content of the pentane is nominally about 6.0 to 6.5 percent by weight. However, the pentane or other suitable expansion agent has a vapor pressure and can leave the beads when they are exposed to air. In order to control the process, it is desirable and preferable to contain or maintain the content of expansion agent so that its concentration is known and generally uniform throughout a batch of beads during each step of the bead-processing practice. Therefore, the incoming raw beads are typically stored in closed containers in a temperature-controlled area so as to retain the known, as required, pentane content.

The first significant step in the handling of the beads is a pre-expansion step. Prior to such processing, it is usually desirable to blend the dense beads with a suitable lubricant such as zinc stearate. A small amount of zinc stearate powder, suitably 0.1 to 0.25 percent by weight of the beads, is satisfactory. The purpose of the lubricant is to facilitate the flow of the beads and to reduce their tendency to clump or bond together during the bead pre-expansion operation.

In the pre-expansion step as applied to EPS, the beads are suitably expanded to about four times their initial diameter, i.e., from about 0.25 mm to about 1.0 mm in diameter. The density of the beads is reduced many fold such as from about 40 pounds per cubic foot to about 1.5 pounds per cubic foot. As described above in the "Background" section of the specification, such bead pre-expansion is commercially carried out in one of two ways. As depicted in the flow diagram, beads may be contacted in a suitable apparatus with live steam. The steam heats the beads to a temperature on the order of 200° F. to 220° F., and they are quickly expanded as described. In an alternative commercial process, the beads are blown or otherwise transferred into a vacuum chamber where they are heated through the walls of the apparatus to a suitable temperature on the order of 200° F. to 220° F. at which they are expanded to a desired size and reduced density. The pre-expanded beads are still somewhat smaller and more dense than the bead cells in the ultimate foundry pattern.

Again, referring to the flow diagram of FIG. 1, the pre-expanded beads are screened so as to break up any clumps or fused-together masses. It is at this stage of the heretofore prior art process that our improvement is practiced.

We expose a batch of the stabilized pre-expanded beads to a stream of hot air at a temperature and for a time suitable to reduce the pentane content of the expanded polystyrene beads by at least one percent by weight and suitably by about one to two percent by weight. At the completion of the pre-expansion operation, polystyrene beads typically have a pentane content of about four to five percent by weight. Following our pentane reduction operation, the beads suitably have a pentane content in the range of about 1.75 to 3.75 percent by weight. The precise reduced pentane content is a matter of some choice based on and correlated with actual pattern molding experience with reduced pentane content beads. So long as the content is reduced to a desired predetermined value, foundry patterns can be reliably and repeatedly molded from the beads and are dimensionally accurate. The patterns are aged and dried (if necessary) for about two to three hours to allow them to come to stable dimensions and configurations. This aging and drying process is much shorter than the stabilization process for the molds required as described above in the prior art. The patterns can then be assembled, if necessary, into complete patterns suitable for a casting process.

Figure 2:
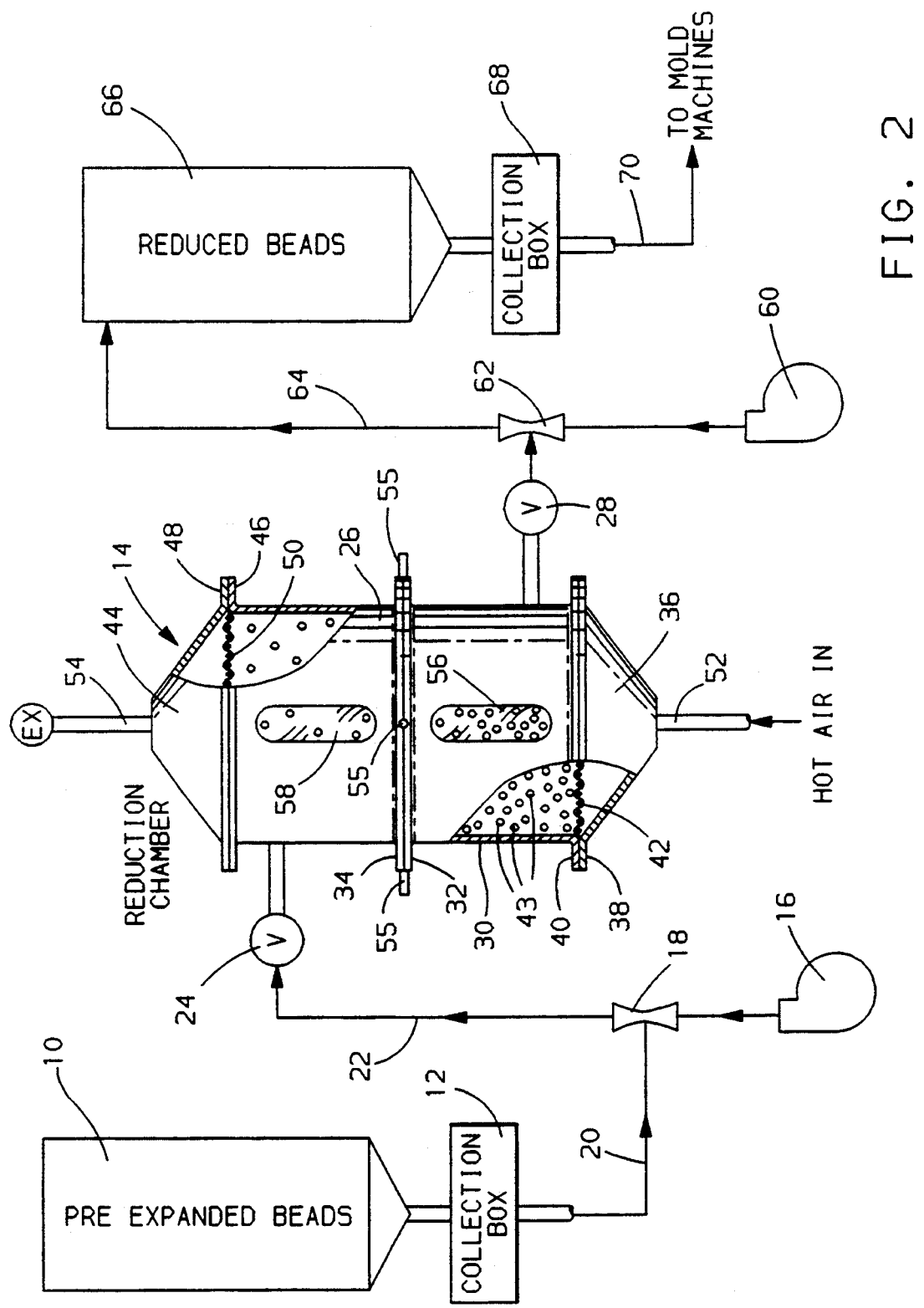
FIG. 2 is a schematic view, partly in section, of suitable apparatus for reducing the expanding agent content in pre-expanded foundry pattern molding beads in accordance with the invention.

FIG. 2 illustrates apparatus suitable for the carrying out of the pentane reduction operation. Following the pre-expansion operation described above, the low density beads are blown or otherwise suitably transferred from the pre-expansion apparatus (not shown) into a permeable storage vessel 10 shown in FIG. 2. They can be held in vessel 10 until there is a requirement for them. The pre-expanded beads have a density of about 1.5 pounds per cubic foot.

After residing in permeable vessel 10, the beads are permitted upon process demand to flow by gravity into collection box 12 and then blown into a suitable pentane reduction chamber indicated generally at 14. The transport of the pre-expanded beads from vessel 10 into reduction chamber 14 is suitably accomplished using blower 16 to blow a stream of ambient air through a jet pump or ejector 18. Ejector 18 of familiar shape comprises a venturi nozzle. As the air passes into the nozzle, it develops suction that draws air and pre-expanded beads through line 20 and entrains them in the airstream flowing through line 22 past then-open valve 24 into the top of the cylindrical reduction chamber 14. As soon as a predetermined quantity of pre-expanded beads (for example, 100 pounds) has been transferred into the pentane reduction vessel 14, valve 24 is closed. Valve 28 at the bottom of chamber 14 is also closed at this stage of the operation. The pentane reduction chamber 14 is a cylinder comprising upper cylindrical section 26 and lower cylindrical section 30, which are bolted together at flanges 32 and 34. The lower section 30 of vessel 14 is closed with a generally conical section 36. Conical section 36 is bolted to the lower cylindrical portion 30 at flanges 38 and 40. Secured between flanges 38 and 40 is a screen 42 at the lower end of the vessel for supporting the beads 43 in the vessel 14 when they are at rest.

At the upper end of the reduction chamber 14 is an upper conical section 44 which is attached to the upper cylindrical section 26 at flanges 46 and 48. Secured between flanges 46 and 48 is upper screen 50 which serves to retain the beads in the vessel when they are treated in a hot air stream as will be described below. Vessel 14 is adapted to receive a stream of hot air through duct 52 at the lower end and to exhaust the air at the top through a duct 54. Sight glasses 56 and 58 enable the pentane reduction operation to be observed.

In a specific example, 100 pounds of pre-expanded polystyrene beads are processed in vessel 14 by passing a stream of hot air at 170° F. at a flow rate of 1245 cubic feet per minute upwardly through reduction vessel 14. The hot air stream suspends the beads in the air so that they are treated substantially uniformly. A relatively small amount of ambient air may be blown (by means not shown) through tubes 55 located at the periphery of the vessel 14 at flanges 32, 34 into the suspended beads to further stir and mix them to facilitate more even treatment by the hot air stream.

In this example, the pre-expanded beads had initial pentane content of about 4.5 percent by weight. They were suspended in the hot air stream at 170° F. for a period of 60 minutes during which time their pentane content was reduced from 4.5 percent by weight to 3.3 percent by weight. At the conclusion of the 60 minute period, the hot air flow was stopped and the beads allowed to settle at rest on the bottom screen 42 of the expansion agent reduction chamber 14.

The beads are then removed from the chamber to a suitable permeable holding vessel 66. The reduction chamber 14 is open to the atmosphere through hot air exhaust 54. Valve 28 is opened, and blower 60 forces a stream of ambient air through ejector 62 drawing pentane-reduced beads through valve 28 and conducting them through line 64 into the top of a permeable vessel 66 where they were allowed to cool and equalize and stabilize their pentane content. When the beads are required for pattern molding operation, they are dropped out of permeable vessel 66 into collection box 68 and then transported through duct 70 to pattern molding machines (not shown) as required.

We prefer that the pentane content of the pre-expanded polystyrene beads be reduced at least one weight percent and preferably one to two weight percent prior to the pattern molding operation. This is advantageously carried out in a fluidizing stream of hot air to vaporize a portion of the pentane from the beads and exhaust it from the pentane reduction chamber 14 through exhaust line 54. The pentane content in the exhaust air can be absorbed into a carbon bed or otherwise suitably disposed of. By reducing the pentane (expansion agent) content of the pre-expanded beads before a molding operation is undertaken, the resultant patterns are much more readily brought to a dimensionally stabilized condition, and the overall process better lends itself to a just-in-time, high speed pattern molding and foundry operation.

Hot air can be produced by any suitable means such as heat exchange with steam, which is usually available in any manufacturing plant. The duration ant flow rate of the hot air stream can easily be determined empirically. A few experimental runs will readily establish, based on the determinable pentane content of the pre-expanded beads, the air temperature, the air flow rate and the treatment time necessary to obtain a desired reduction in the expansion agent content in the polymer beads. We have found that a reduction in pentane content from normally processed, pre-expanded beads results in more stable patterns (with less dimensional variability) molded from the reduced beads. It is readily easy to establish an optimum reduction based on the pentane content of pre-expanded beads and the desired pentane level for molded patterns based on a plant's actual molding experience.

In general, the greater the pentane (expanding agent) content of a pattern, the greater the variation of its dimensions upon aging. However, sufficient pentane must be retained to mold all sections of a pattern. The lower the bead pentane content, the less the shrinkage after molding and the smaller the pattern as ejected from the mold. The shrinkage allowances used to build the mold must be adjusted prior to mold construction in order to achieve molded patterns and castings of the correct size.

It is a simple matter to select a suitable time and temperature for the hot air treatment so as to obtain the desired reduction in the pre-expanded beads. The pentane (expansion agent) content of pre-expanded or reduced beads is readily determined by taking a representative sample and heating it for a time suitable to drive off all the pentane and then measuring the weight loss of the beads.

While our invention has been described in terms of a few preferred embodiments thereof, it will be recognized that other forms could readily be adapted by one skilled in the art. Accordingly, the scope of our invention is intended to be limited only by the scope on the following claims.

The embodiments of the invention in which an exclusive property or privilege is claimed are defined as follows:

1. In a method of making expendable casting patterns from relatively high density polymer beads containing an initial quantity of dispersed vapor-forming expansion agent, said method comprising heating the beads to pre-expand them to a lower density, larger volume, cellular state for pattern molding in which state they then contain a smaller quantity of the expansion agent, again heating the beads to further expand and mold and bond them together into a casting pattern and thereafter aging the pattern to a dimensionally stable condition, the improvement comprising heating the pre-expanded cellular beads in a stream of heated air at a temperature and for a time to reduce the expansion agent content to a level still permitting pattern molding but permitting a reduction in pattern aging time at ambient conditions and thereafter cooling the beads to ambient conditions before they are again heated for said molding into said casting pattern.

2. The method as recited in claim 1 in which pre-expanded polystyrene beads containing pentane as an expansion agent are heated in a stream of hot air at 150° F. to 200° F. for a period of 30 to 90 minutes.

3. The method as recited in claim 1 in which pre-expanded polystyrene beads containing by weight about four to five percent pentane are heated in hot air to reduce the pentane content by about one weight percent or more.

4. The method as recited in claim 2 in which molded patterns are aged for three hours or less at ambient conditions.

5. The method as recited in claim 3 in which molded patterns are aged for three hours or less at ambient conditions.

* * * * *